United States Patent [19]
Kobayashi et al.

[11] Patent Number: 5,084,855
[45] Date of Patent: Jan. 28, 1992

[54] DEVICE FOR PREVENTING THE ERRONEOUS INSERTION OF A DISC IN A CD PLAYER FOR VEHICLES

[75] Inventors: Kazuo Kobayashi; Masanori Sugihara; Yoshinori Yamada, all of Saitama, Japan

[73] Assignee: Pioneer Electronic Corporation, Tokyo, Japan

[21] Appl. No.: 246,486

[22] Filed: Sep. 12, 1988

[30] Foreign Application Priority Data

Sep. 12, 1987 [JP] Japan .................... 62-139802[U]

[51] Int. Cl.⁵ .................................. G11B 33/02
[52] U.S. Cl. .................... 369/752; 369/771; 369/270
[58] Field of Search .............. 369/75.1, 75.2, 77.1, 369/77.2, 270, 271; 360/99.01, 99.02, 99.05, 99.12

[56] References Cited
U.S. PATENT DOCUMENTS

| | | | |
|---|---|---|---|
| 4,507,768 | 3/1985 | Ikedo et al. | 369/77.1 |
| 4,592,039 | 5/1986 | Toyoguchi et al. | 369/77.1 X |
| 4,641,297 | 2/1987 | Watanabe | 369/75.2 |
| 4,785,365 | 11/1988 | Ohkita | 369/77.1 |
| 4,811,324 | 3/1989 | Ikedo et al. | 369/75.2 |

*Primary Examiner*—William M. Shoop, Jr.
*Assistant Examiner*—David Martin
*Attorney, Agent, or Firm*—Sughrue, Mion, Zinn, Macpeak & Seas

[57] ABSTRACT

A device for preventing the erroneous insertion of a disc in a vehicle CD player. A movable cover is swingably mounted on a frame through a movable cover opening and closing arm. An operating member is coupled to the movable cover opening and closing arm, the operating member being operated in association with a disc clamping operation of a clamper arm. After the clamper arm clamps the disc, the movable cover opening and closing arm is swung so that the movable cover is swung to a disc-inserting-opening closing position.

5 Claims, 8 Drawing Sheets

FIG. 17

DEVICE FOR PREVENTING THE ERRONEOUS INSERTION OF A DISC IN A CD PLAYER FOR VEHICLES

BACKGROUND OF THE INVENTION

This invention relates to a device for preventing the insertion of a disc into a CD player when the CD player has already been loaded with a disc (hereinafter referred to as "a device for preventing the erroneous insertion of a disc in a CD player", when applicable).

In one example of a CD player for vehicles, a disc inserting opening is formed in the front wall of the casing which faces the driver (or operator) on the driver seat, and a movable (or swingable) cover is provided for the disc inserting opening to freely open and close the latter. The movable cover is operated in association with a loading mechanism which conveys the disc in the player until the disc reaches the position where it is engaged with the turntable.

In general, a CD player for vehicles should be compact in size because of the limited space available for installation. Therefore, in a CD player which is so designed that the disc, after being inserted horizontally to a predetermined position in the player, is held on a supporting frame having a floating mechanism such that it is engaged with the turntable, it is impossible to provide a sufficiently large space between the rear end of the disc and the disc inserting opening, or the movable cover.

Such a CD player will be subjected to a large amount of vibration when operated because it is used on a vehicle which is traveling, and the supporting frame holding the turntable is supported on the casing through the floating mechanism. Therefore, a disc inserted into the player is liable to be held in an unstable manner. Accordingly, if the movable cover is closed before the disc mounted on the spindle is completely clamped, the disc may strike against the movable cover and break or may shift various components in the player out of position.

SUMMARY OF THE INVENTION

In view of the foregoing, an object of this invention is to provide a device for preventing the erroneous insertion of a disc in a vehicle CD player which, even when the vehicle is subjected to a large amount of vibration, eliminates the above-described problem. Namely, that a disc inserted into the player collides with the movable cover and breaks or shifts various mechanisms in the player out of position.

The foregoing object of the invention has been achieved by the provision of a device for preventing the erroneous insertion of a disc in a CD player for vehicles. More specifically, a movable cover is mounted adjacent to a disc inserting opening to open and close the opening. With the movable cover opened, a disc is inserted into the player. When the disc is set in place in the player, the disc is held on a turntable with a clamper arm, and the turntable is rotated to reproduce signals recorded on the disc. According to the invention, the movable cover is swingably mounted on a frame by means of a movable cover opening and closing arm. Further, an operating member is coupled to the movable cover opening and closing arm, the operating member being operated in association with the disc clamping operation of the clamper arm. After the clamper arm clamps the disc, the movable cover opening and closing arm is swung so that the movable cover is swung to a disc-inserting-opening closing position.

In the device of the invention, the movable cover is swingably mounted adjacent the disc inserting opening of the player with the aid of the movable cover opening and closing arm. The operating member operating in association with the disc clamping operating of the clamper arm is provided for the movable cover opening and closing arm. The operating member causes the movable cover to be held at the open position until the disc is clamped by the clamper arm. After the disc is clamped by the clamper arm, the movable cover opening and closing arm is swung so that the movable cover is swung to the closed position. Thus, with the device of the invention, the movable cover will not close the disc inserting opening when the disc is held in an unstable manner during the loading operating. Therefore, the above-described problem of the disc colliding with the movable cover and breaking is prevented.

DESCRIPTION OF THE PREFERRED EMBODIMENTS

One embodiment of the invention will be described with reference to FIGS. 1 through 14.

Figure 1:
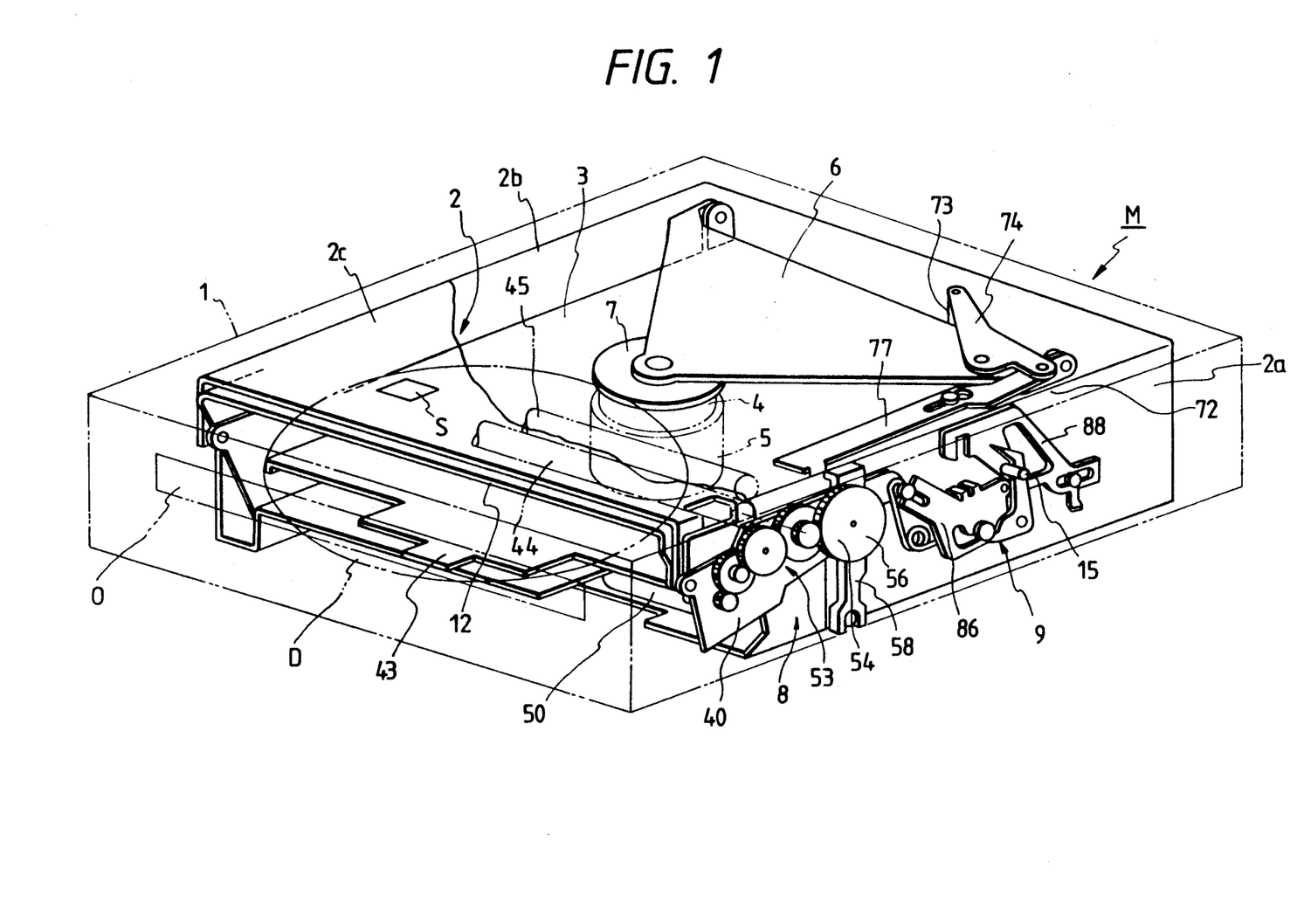
FIG. 1 is a perspective view showing a disc player to which a device for preventing the erroneous insertion of a disc according to the invention as applied.
Figure 2:
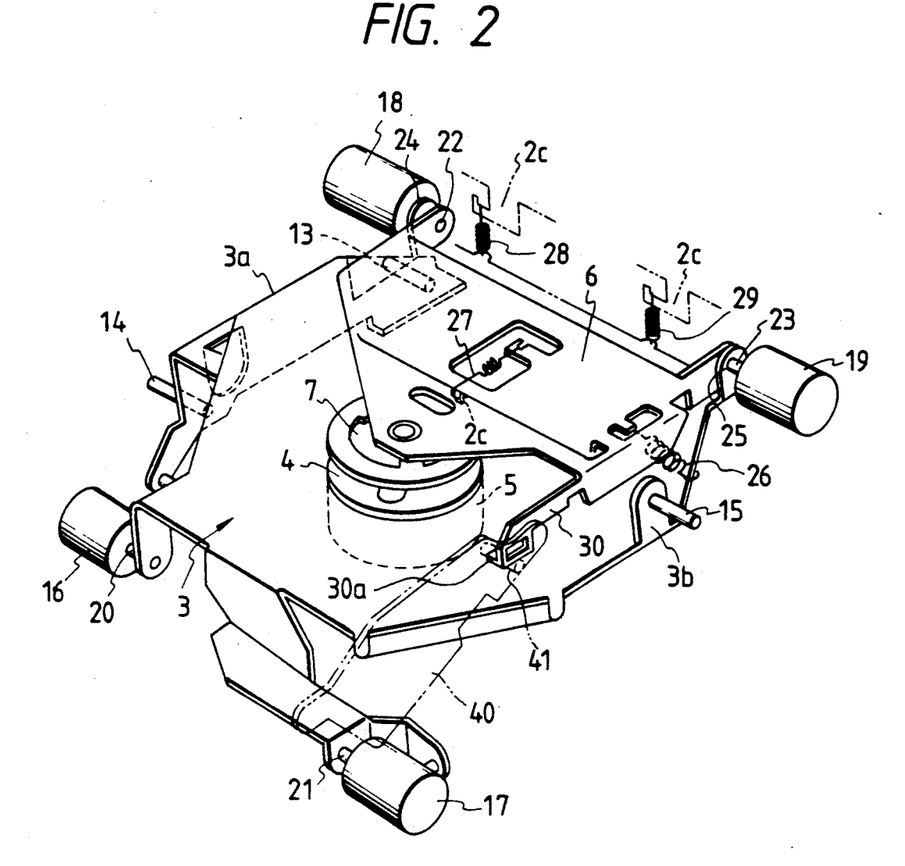
FIG. 2 is a perspective view showing a supporting frame on which a reproducing device is mounted.

As shown in FIG. 1, a CD player M mounted on a vehicle has a casing 1, and a disc inserting opening O for inserting a disc D into the player. The opening O is formed in the front wall of the casing 1. A frame 2 having right and left side plates 2a and 2b and a top plate 2c is built in the casing 1. A supporting frame 3, on which a reproducing device is mounted, as shown in FIG. 2, is supported by the frame 2. A turntable 4 is mounted on the supporting frame 3 and rotated by a spindle motor 5. A triangular clamper arm 6 is swingably mounted over the rear end portion of the supporting frame 3. A circular clamper 7 is secured to the vertex of the triangular clamper arm 6 so that it is moved downwardly to clamp the disc D by pushing the central portion of the disc D against the turntable 4.

A loading mechanism 8 for conveying the disc into the player is provided on the front portion of the right side plate 2a of the frame 2, and a locking mechanism 9 for fixing the supporting frame 3 on which the spindle motor 5, etc., are mounted is provided on the rear portion of the right side plate 2a.

Figure 3:
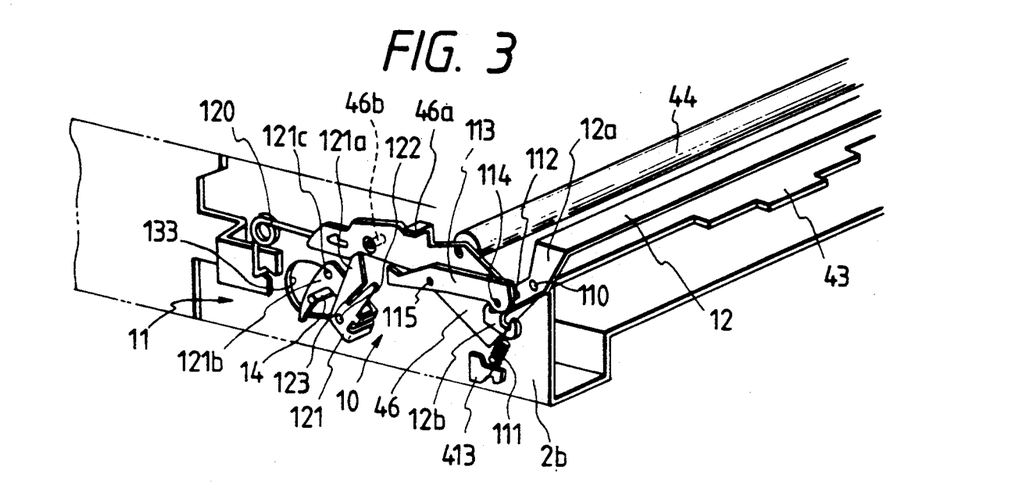
FIG. 3 is a perspective view showing a movable cover opening and closing mechanism.

A movable cover opening and closing mechanism 10 as shown in FIG. 3, and a locking mechanism 11 for fixing the above-described supporting frame 3 are provided on the left side plate 2b of the frame 2. A movable cover 12 extending over the entire length of the disc inserting opening O is swung along the disc inserting opening O and inside the casing 1 by the movable cover opening and closing mechanism 10, to open and close the disc inserting opening O.

The supporting frame 3, as shown in FIG. 2, has a side plate 3a on the left side. Two locking pins 13 and 14 protrude outwardly from the left side plate 3a. The supporting frame 3 has an ear plate 3b which extends from the rear part of the right side, and a locking pin 15 which protrudes outwardly from the ear plate 3b. These locking pins 13, 14 and 15 are locked by the locking mechanisms 9 and 11 (described later in more detail) when the player is not in operation. Pins 20 and 21 protrude outwardly from both sides of the front end portion of the supporting frame 3 and are supported by dampers 16 and 17, respectively, secured to the frame 2. Pins 22 and 23 protrude outwardly from both sides of the rear end portion of the supporting frame 3 and are supported by dampers 18 and 19, respectively, fixed to the frame 2. The supporting frame 3 is suspended from the top plate 2c of the frame 2 through suspension springs 28 and 29 positioned in place. The end portions of the pins 22 and 23 are coupled to ear plates 24 and 25, respectively, of the supporting frame 3. The right and left ends of the rear end portion of the clamper arm 6 are pivotally coupled to the pins 23 and 22, respectively. The clamper arm 6 has a tension spring 26 on the right side (in FIG. 2) which is used to swing the clamper arm 6 downwardly. One end of the tension spring 26 is secured to the supporting frame 3, and the other end is secured to the clamper arm 6. The lower end of a small tension spring 27 is secured to the central portion of the clamper arm 6, and the upper end is secured to the top plate 2c of the frame 2, so that the frame 3 is urged through the clamper arm 6.

Figure 4:
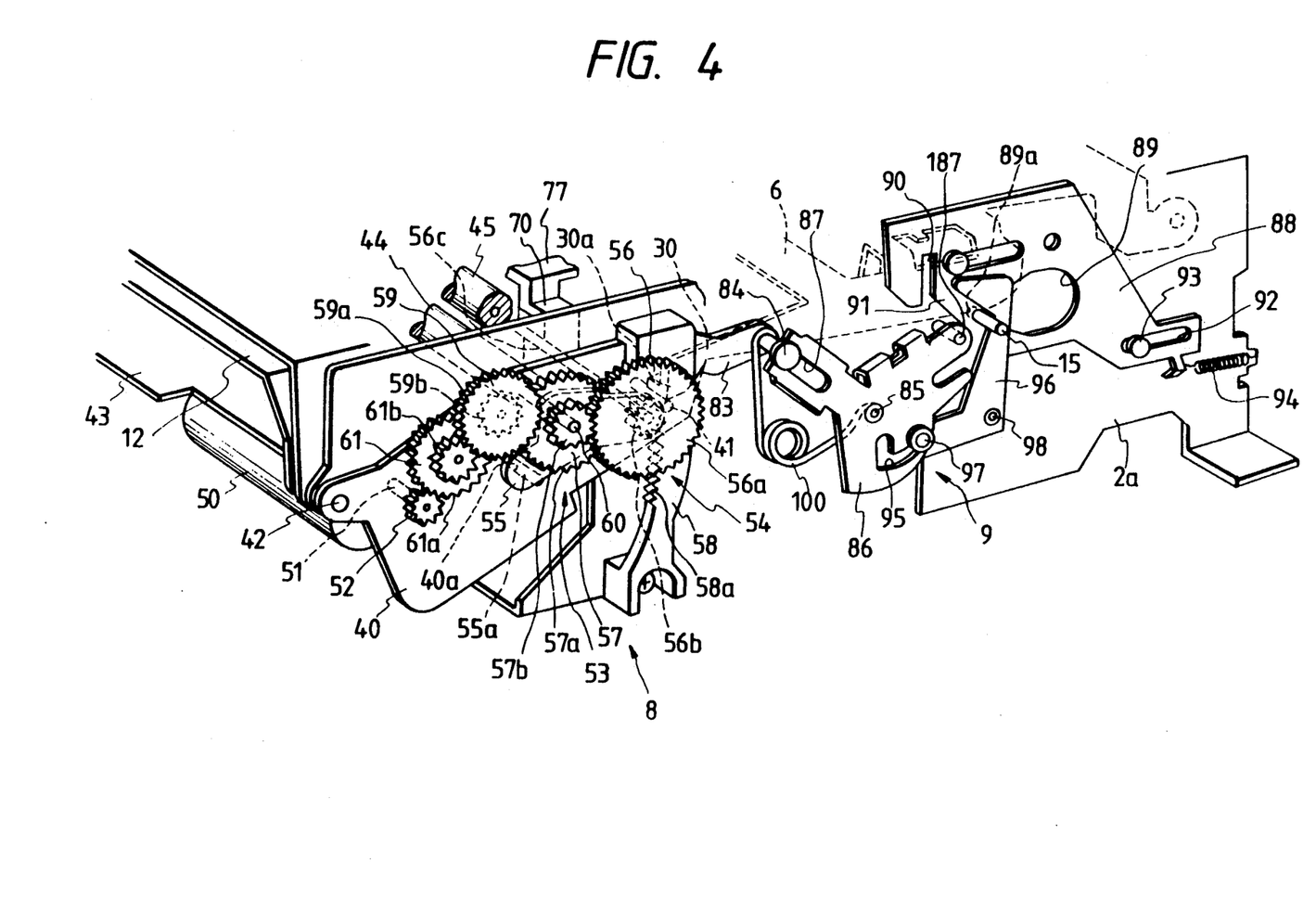
FIG. 4 is a perspective view showing a loading mechanism.

A regulating arm 30 for regulating the vertical swing of the clamper arm 6 extends from the clamper arm in the direction of the right edge of the clamper arm 6. The front end portion of the regulating arm 30 is formed into a locking piece 30a which extends horizontally (FIGS. 2 and 4). The locking piece 30a cooperates with a stopper pin 41 embedded in the front end portion of a loading arm 40 as shown in FIG. 4.

The loading arm 40 is pivotally mounted on a pin 42 embedded in the right side plate 2a of the frame 2 as shown in FIG. 4, so that it is positioned on the right side of a loading guide plate 43 which is elongated in the widthwise direction of the frame 2. The loading guide plate 43 is used to guide a disc D. A driving loading roller 44 is rotatably mounted behind the loading arm 40, and a driven roller 45 (FIG. 1) is supported by the frame 2 in such a manner that it is positioned over the driving loading roller 44. The driving loading roller 44 cooperates with the driven roller 45 to convey the disc D.

As shown in FIG. 3, a movable cover operating arm 46 is provided at the end of the loading guide plate 43 which is opposite to the end where the loading arm 40 is provided, in such a manner that the movable cover operating arm 46 is integrated with the loading guide plate 43. The arm 46 is coupled to the driving, loading roller 44 at the other end. A reversible loading motor 50 is provided below the loading guide plate 43 on the side of the loading arm 40 (FIG. 4). The rotary shaft 51 of the loading motor 50 is extended through the arm 40. A driving sprocket 52 is mounted on the rotary shaft 51 at the end. Rotation of the driving sprocket 52 is transmitted to a gear mechanism 53 including a planetary gear mechanism 54. The planetary gear mechanism 54 has a planet gear (first gear) 56 provided at the rear end of an arm 55. The planet gear 56 is made up of a large diameter gear 56a and a small diameter gear 56b. The large diameter gear 56a is engaged with a small diameter gear 57b of a second gear 57. The small diameter gear 56b is engaged with the arcuate gear 58a of an arcuate gear member 58 which is secured to the right side plate 2a of the frame 2 in such a manner that it extends vertically. The second gear 57 is secured to one end of a pin 60, the other end of which is secured to the above-described loading roller 44. Therefore, the loading roller 44 is turned by the second gear 57.

The arm 55 is pivotally mounted on the pin 60. Therefore, as the second gear 57 is turned clockwise in the FIGURE, the arm 55 is allowed to turn clockwise about the pin 60 by the planet gear 56 while the small diameter gear 56b of the planet gear 56 is allowed to engage with the arcuate gear 58a. A large diameter gear 57a of the second gear 57 is engaged with a small diameter gear 59b of a third gear 59. A large diameter gear 59a of the third gear 59 is engaged with a small diameter gear 61b of a fourth gear 61. A large diameter gear 61a of the fourth gear 61 is engaged with the above-described driving sprocket 52 of the loading motor 50. A pin 55a protrudes inwardly from the front end of the arm 55 such a manner that it is engaged with an elongated hole 40a formed in the loading arm 40 thereby to regulate the locking of the arm 55.

Figure 5:
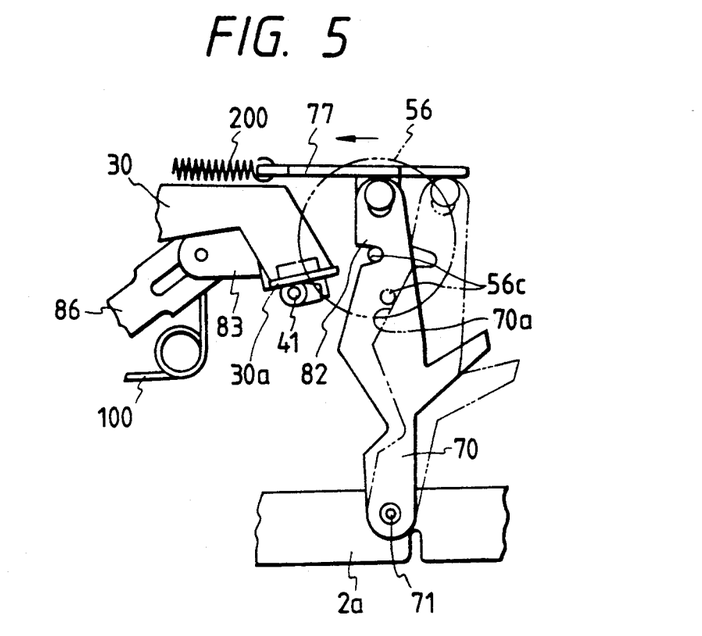
FIG. 5 is an explanatory diagram showing a loading arm lowering mechanism.
Figure 6:
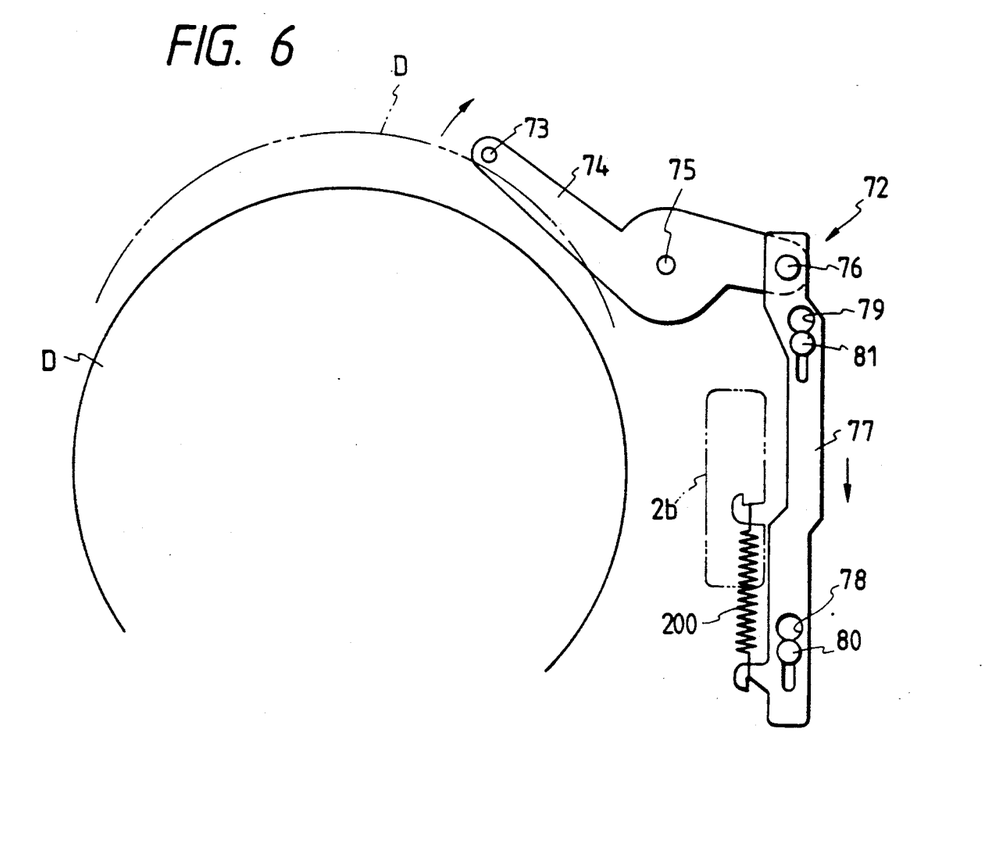
FIG. 6 is a plan view showing a link mechanism provided for the loading arm lowering mechanism.

As shown in FIG. 5, a regulating cam 70 for regulating the downward swing of the loading arm 40 is provided behind the planet gear 56. More specifically, the regulating cam is mounted on the right side plate 2a of the frame 2 in such a manner that it is swingable about a pin 71 coupled to the lower end portion of the regulating cam 70. The regulating cam 70 forms a part of a loading arm lowering mechanism. The regulating cam 70 is operated by a link mechanism 72 forming a part of the loading arm lowering mechanism which is shown in FIG. 6. The link mechanism 72 has a first link 74 with a detecting pin 73 which, when the disc D is inserted in place as shown in FIG. 1, is brought into contact with the disc D. The first link 74 is pivotally mounted on a pin 75 embedded in the top plate 2c of the frame 2 and is rotatably coupled through a pin 76 to the rear end portion of a second link 77 which extends along the upper portion of the side plate of the frame 2. The front end portion of the second link 77 is pivotally coupled to the upper end portion of the above-described regulating cam 70. The second link 77 has two elongated holes 78 and 79. These holes 78 and 79 are engaged with guide pins 80 and 81, respectively, embedded in the frame 2, so that the second link 77 is guided along the right side plate 2a of the frame 2. The link 77 is urged backwardly of the frame 2 by means of a tension spring 200.

A cut 82 is formed in the upper portion of the regulating cam 70, as shown in FIG. 5, so that the pin 56c of the planet gear 56 is freely engageable with and disengageable from the cut 82. When the end of the disc D strikes against the detecting pin 73, the link mechanism 72 is operated to slide the link 77 forwardly of the frame, whereupon the regulating cam 70 is swung in the direction of the arrow in FIG. 5 to release the planet gear pin 56c.

As was described before, the stopper pin 41 is embedded in the rear end portion of the loading arm 40 as shown in FIG. 4. The stopper pin 41 is engaged with the locking piece 30a of the regulating arm 30 of the clamper arm, to thereby regulate the lowering of the clamper arm 6. An arm 83 which protrudes from the rear end of the loading arm 40 has a coupling pin 84. The pin 84 is engaged with a relatively long slit 87 formed in one end portion of a conversion arm 86 which is pivotally mounted by means of a pivot pin 85 on the right side plate 2a of the frame 2. An operating pin 187 is connected to the other end portion of the conversion arm 86. The operating pin 187 is used to slide a lock lever 88 along the right side plate 2a of the frame 2. The lock lever 88 has an opening 89 at the center. The opening 89 has a narrow cut 89a forming a part of the front edge thereof in such a manner that the lock pin 15 protruding from the supporting frame 3 (FIG. 2) can go in and out of the cut 89a. The front end portion of the lock lever 88 has an arcuate guide side (line) 91 and a locking recess 90 merging with the arcuate guide side 91 so that, as the conversion arm 86 swings counterclockwise in the FIGURE, the operating pin 187 is swung along the guide side 91 to go into the locking recess 90, whereby the lock lever 88 is moved forwardly of the frame. When, under this condition, the conversion arm 86 swings clockwise, the operating pin 187 causes the lock lever 88 to slide backwardly. An elongated hole 92 is formed in the rear end portion of the lock lever 88. A guide pin 93 secured to the right side plate 2a of the frame 2 is engaged with the elongated hole 92, and the lock lever 88 is urged backwardly by means of a tension spring 94 connected to the rear end of the lock lever 88.

An L-shaped guide hole 95 is formed in the lower portion of the middle of the conversion arm 86. A pin 97 embedded in one end portion of a lock arm 96 is engaged with the guide hole 95. The lock arm 96 is L-shaped and is pivotally mounted on the right side plate 2a through a pin 98 provided at the center. The rear end portion of the lock arm 96 is L-shaped so that it is engaged with and disengaged from the lock pin 15 as the lock arm 96 swings. A return spring 100 is connected between the pin 85 of the conversion arm 86 and the coupling pin 84 embeded in the protruding arm 83 of the loading arm 40 so that the coupling pin 84; i.e., the protruding arm 83 of the loading arm 40 is kept apart from the pin 85 of the conversion arm 86. The conversion arm 86, the lock lever 88, and the lock arm 96 form a lock mechanism 9 for the lock pin 15.

The movable cover opening and closing mechanism 10 for opening and closing the movable cover 12, an essential point of the invention, and a locking mechanism for the locking pins 13 and 14 of the supporting frame (FIG. 2) will be described with reference to FIGS. 3, 7 and 8.

Figure 12:
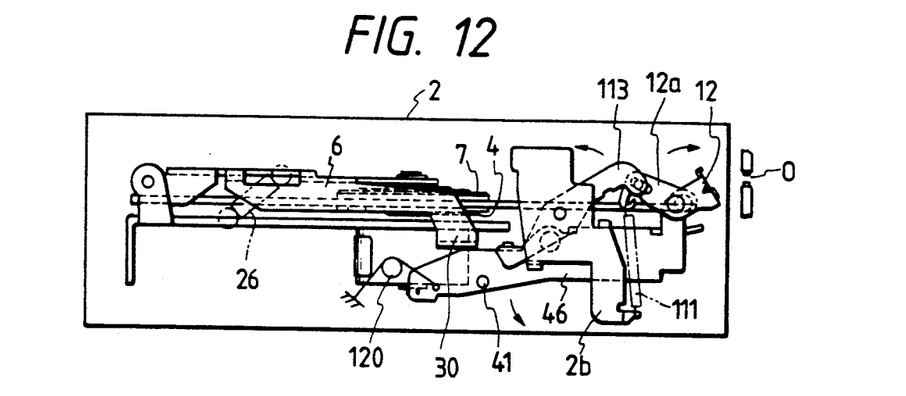
FIG. 12 is a side view showing the movable cover of the movable cover opening and closing mechanism which is at the closed position.
Figure 13:
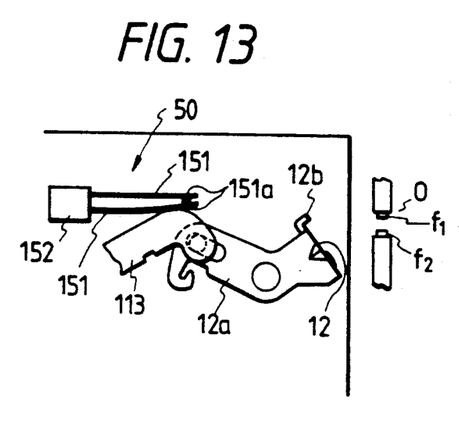
FIG. 13 is a side view showing an alarm mechanism which is not in operation.

The opening and closing arm 12a (on the same side as the left side plate 2b) of the movable cover 12 is pivotally mounted on the left side plate 2b through a pin 110 secured to the central portion thereof. One end of a tension spring 111 is connected to the L-shaped lower end portion 12b of the opening and closing arm 12a, while the other end is connected to a mounting plate 413 secured to the left side plate 2b, so that the movable cover 12 is kept open. An elongated hole 112 is formed in the middle of the movable cover opening and closing arm 12a. The elongated hole 112 thus formed is engaged with a pin 114 embedded in the front end portion of a swingable arm 113 which is pivotally mounted on the left side plate 2b with a pivot pin 115. The rear end portion of the swingable arm 113 cooperates with the movable cover operating arm 46 which is provided on the left side of the loading guide plate 43 in such a manner that it is integral with the loading guide plate 43, to rotatably support the driving loading roller 44. An operating protrusion 46a extends outwardly from the upper end of the middle of the operating arm 46. A return spring 120 is connected between the rear end of the movable cover operating arm 46 and the left side plate 2b. In the state shown in FIG. 3, the spring 120 urges the arm 46 upwardly (clockwise); however, when the rear end of the arm 46 is moved downwardly, as shown in FIG. 12, the spring urges the arm 46 downwardly (counterclockwise).

The locking mechanism 11 for locking the locking pin 14 is operated in association with the movable cover operating arm 46. The locking mechanism 11 has a rotary locking member 121. The rotary locking member 121 is pivotally mounted on a pin 122 embedded in the left side plate 2b, and has a first operating piece 121a and a second operating piece 121b integral with the first operating piece 121a. The first operating piece 121a has a locking lot 123. When the movable cover 12 is at its open position, the first operating piece 121a is extended upwardly, and when the movable cover operating arm 46 is moved downwardly, the operating pin 46b of the arm 46 is inserted in the locking groove 123, so that the rotary locking member 121 is turned clockwise in the FIGURE. The second operating piece 121b is beak-shaped. The inner arcuate edge of the second operating piece 121b is engaged with the locking pin 14 to lock the supporting frame 3. Furthermore, an operating pin 121c is embedded in the bent portion of the second operating piece 121b. The operating pin 121c is kept engaged with a cut 130a which is formed in the upper portion of a locking plate as shown in FIG. 8. The locking plate 130 has an opening 131 in the middle, and it is so designed as to slide back and forth along the left side plate 2b as the second operating piece 121b swings. The opening 131 includes a narrow locking cut 131a forming part of the front edge of the opening 131. The locking pin 14 protrudes through an opening 133 formed in the left side plate 2b in such a manner that it is positioned at the center of the opening 133. A locking slot 134 is formed in the rear end portion of the locking plate 130. When the locking plate 130 is at its rear position as shown in FIG. 8, the locking pin 14 is locked by the locking cut 131a and the second operating piece 121b, while the locking pin 13 is locked by the locking slot 134.

Figure 7:
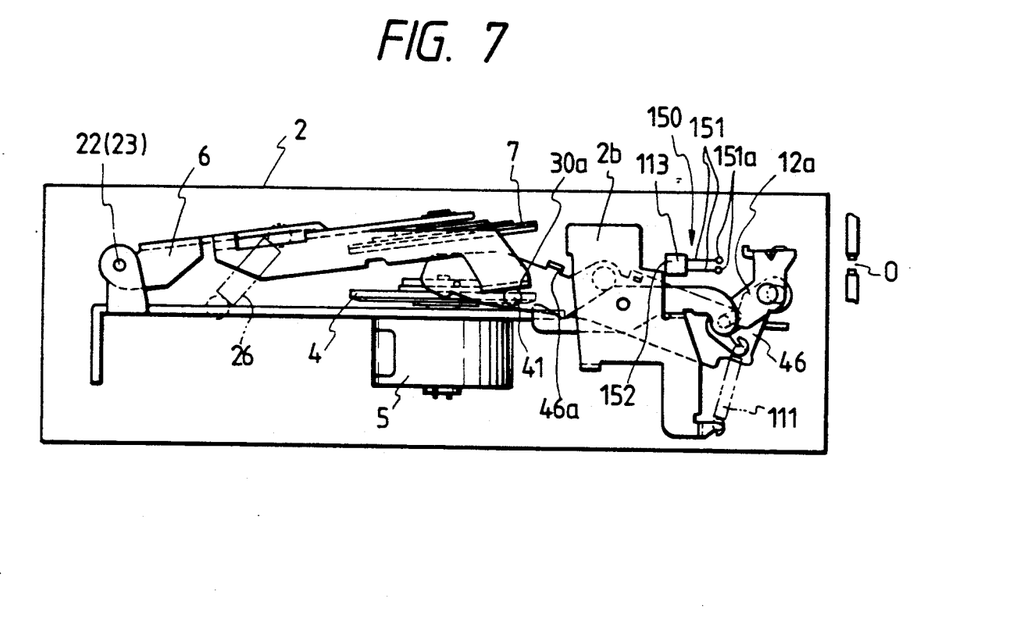
FIG. 7 is a side view showing the movable cover opening and closing mechanism.
Figure 8:
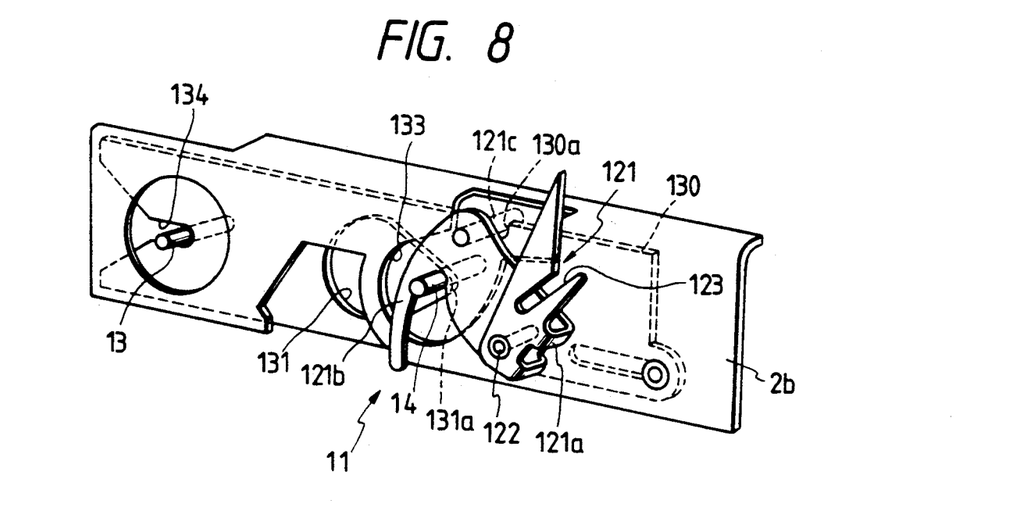
FIG. 8 is a perspective view, with parts cut away, showing the locking mechanism of the supporting frame which is operated in association with the movable cover opening and closing mechanism.

An alarm mechanism 150 is provided above the movable cover opening and closing arm 12a as shown in FIG. 7. The alarm mechanism 150 detects when a disc is newly inserted, with the disc inserting opening O closed by the movable cover 12, to output an alarm signal. The alarm mechanism 150 comprises two leaf springs 151 arranged in parallel with a space therebetween. The leaf springs 151 are extended from a detecting section 152. The detecting section 152 is so designed that when contacts 151a at the ends of the leaf springs 151 are disengaged from each other an alarm signal is produced.

The operation of the device thus constructed will be described.

When a disc D is inserted into the player through the disc inserting opening O formed in the casing 1, a sensor S provided on the front end portion of the top plate 2c detects the insertion of the disc D to start the loading motor 50. In this case, the movable cover 12 is at the upper position (open position) as shown in FIG. 3, while the locking mechanism 11 operating in association with the movable cover opening and closing mechanism 10 for the supporting frame 3 is at the locking position thus locking the locking pins 13 and 14 as shown in FIG. 8. In the loading mechanism 8, as shown in FIG. 4 the first gear (planet gear) 56 is positioned above, and the driving loading roller 44 and the driven loading roller 45 cooperating with the driving loading roller 44 are set close to each other so that the disc D inserted can be moved into the player. The locking mechanism 9 operating in association with the loading mechanism 8 takes the locking position locking the locking pin 15.

In this operation, with the front end portion of the regulating arm 30 abutted against the stopper pin 41 of the loading arm 40, as shown in FIGS. 2 and 4, the clamper arm 6 is prevented from coming down; that is, it is held at the upper position. Therefore, the clamper 7 is fully opened above the turntable 4 to receive the disc D.

Figure 11:
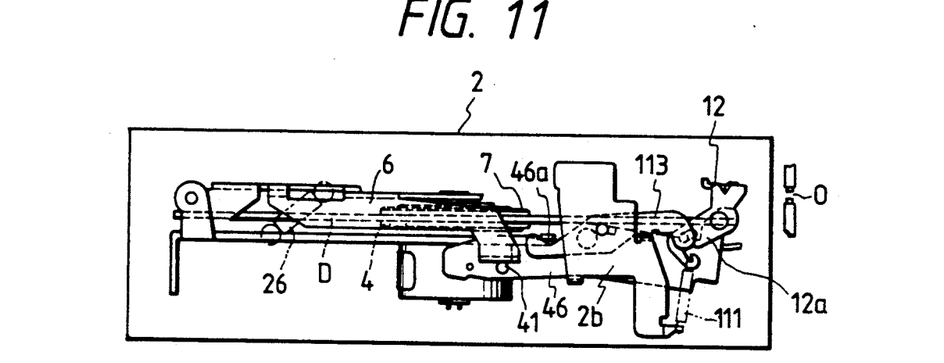
FIG. 11 is a side view showing the disc which is clamped by the clamper of a clamper arm before the movable cover opening and closing mechanism operates.

With the supporting frame 3 which supports the reproducing mechanism thus locked, the disc D is inserted into the frame 2 with the two loading rollers 44 and 45. The end of the disc D thus inserted is struck against the detecting pin 73 as shown in FIG. 6, and as a result, the first link 74 is turned clockwise in the figure. Therefore, the second link 77 is slid forwardly of the frame 2 while pulling the tension spring 200, thus swinging the regulating cam 70 forwardly of the frame 2 to release the pin 56c of the planet gear 56 as shown in FIG. 5. As the loading motor 50 is rotated forwardly, the third gear 59 is turned counterclockwise while the second gear 57 is turned clockwise, as shown in FIG. 4. In this operation, the arm 55 of the planet gear 56 loosely mounted on the shaft 60 of the second gear 57 is turned clockwise by the third gear 59 so that the planet gear 56 is moved downwardly. In this operation, as the pin 55a embedded in the front end portion of the arm 55 is engaged with the elongated hole 40a, the swing of the arm 55 is limited to a predetermined range. Therefore, the turn of the third gear 59 turns the arm 55 clockwise in the figure, and when the arm 55 is stopped, the second gear 57 and the planet gear 56 are turned about the rotary shafts (or pins 60 and 56a), respectively. As the arm 55 turns as described above, the small diameter gear 56b of the planet gear 56 is engaged wit the arcuate gear 58a of the arcuate gear member 58, as a result of which the planet gear 56 comes down the arcuate gear 58a while the loading arm 40 is therefore swung clockwise in the figure. In this operation, the driving, loading roller 44 comes down while leaving the driven loading roller 45 to release the disc D, and the regulating arm 30 of the clamper arm 6 moves downwardly while swinging counterclockwise in the figure. When the planet gear 56 comes down to the middle position, as shown in FIG. 11, the disc D is dropped on the turntable 4 by its own weight and the elastic force of the tension spring and is held by the clamper 7. In this operation, the pin 56c of the planet gear is held abutted against the cam surface 70a of the regulating cam 70, and therefore the second link 77 of the link mechanism is pulled forwardly of the frame 2, whereby the first link 74 is further turned clockwise. Therefore, when the disc D is played, the rotation of the disc D will not be obstructed by the detecting pin 73 of the first link 74.

Figure 10:
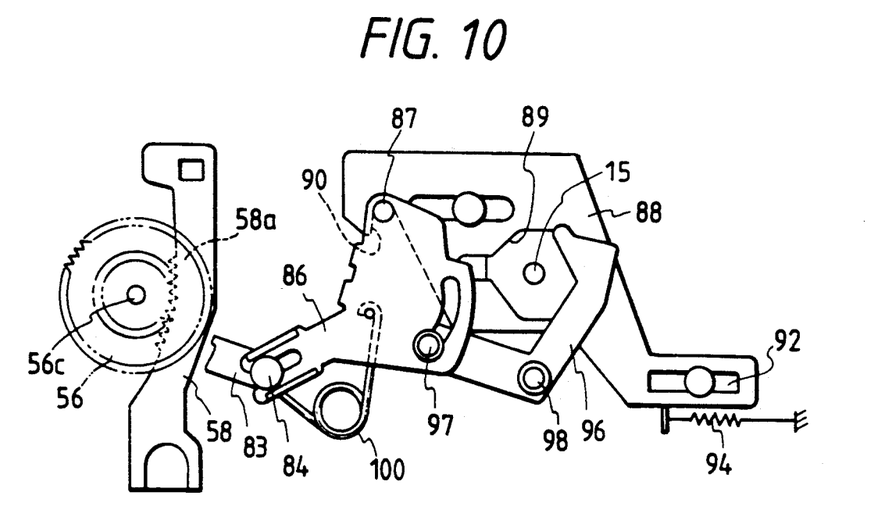
FIG. 10 is a side view showing the locking mechanism of the supporting frame which is operated in association with the loading arm, which is released.

As the planet gear 56 is further moved downwardly, the conversion arm 86, which is coupled through the coupling pin 84 to the end of the loading arm 40, is turned counterclockwise in the figure. When the planet gear 56 approaches the lowest position, the return spring 100 causes the conversion arm 86 and the loading arm 40 to turn in such a manner that these arms 86 and 40 repel each other. Thus, the arms 86 and 40 are positioned as shown in FIG. 10. As a result, the lock lever 88 is slid forwardly, while the pin 97 is slid along the L-shaped opening 95, so that the lock arm 96 is turned clockwise in the figure to release the lock pin 15.

The movable cover opening and closing mechanism 10 and the locking mechanism 11 operate in association with the operation of the loading mechanism 8. The operations of these mechanisms will be described in more detail.

As the loading arm 40 is turned downwardly, the movable cover operating arm 46, which forms part of the movable cover operating member integrally coupled through the loading guide plate 43 to the loading arm 40, is also turned downwardly (FIG. 11). When the movable cover operting arm 46 is moved downwardly to the position shown in FIG. 11 (in this operation, the disc D being clamped by the turntable 54 and the clamper 7), the operating protrusion 46a formed on the upper edge of the arm 46 strikes against the rear end portion of the swingable arm 113. Under this condition (FIG. 11), the planet gear 56 is further moved downwardly, the movable cover operating arm 46 is also moved downwardly, while the swingable arm 113 is turned counterclockwise through a large angle so that its front end portion is greatly raised as shown in FIG. 12. As a result, the movable cover opening and closing arm 12a is turned clockwise in the figure, while the movable cover 12 is moved to the close position to close the disc inserting opening O while pulling the tension spring 111.

Figure 9:
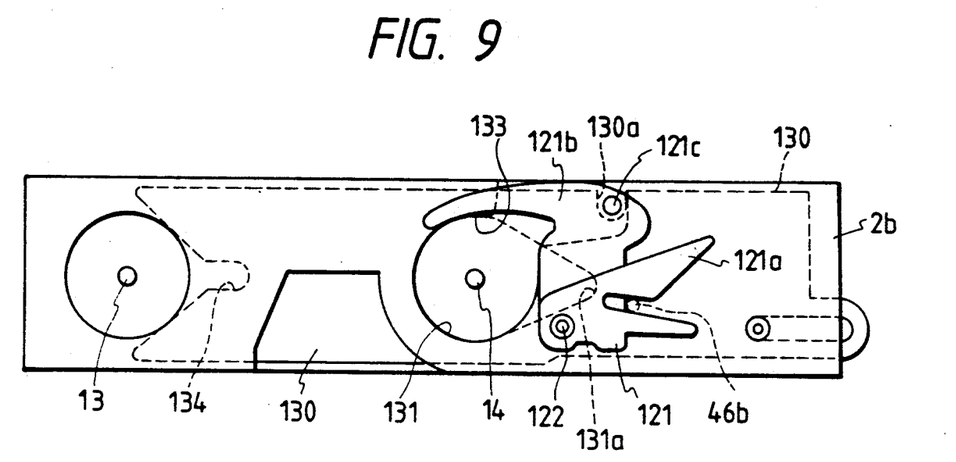
FIG. 9 is a side view of the locking mechanism shown in FIG. 8 which is released.

When the movable cover operating arm 46 is moved downwardly, its pin 46b is engaged with the locking groove 123 of the rotary locking member 121, so that the latter 121 is turned clockwise. When the arm 46 reaches the lowest position, the rotary locking member 121, etc., are positioned as shown in FIG. 9. That is, the first and second operating pieces 121a and 121b of the rotary locking member 121 are held substantially horizontal, and the second operating piece 121b is disengaged from the locking pin 14. When the second operating piece 121b of the rotary locking member 121 is turned clockwise, the locking plate 130 is slid horizontally to the right in FIG. 8 (forwardly of the frame 2) because the pin 121c is engaged with the locking plate 130. As a result, the locking cuts 131a and 134 are disengaged from the locking pins 14 and 13, respectively. The release of the locking pins 13 and 14 is carried out in synchronization with the release of the locking pin 15 from the locking mechanism on the opposite side. Upon release of the locking mechanism 9 and 11, the supporting frame 3 and turntable 4 holding the reproducing device are supported, in a floating manner, by the dampers 16 through 19 and the suspension springs 28 and 29 of the supporting frame 3. Thus, the preparatory operation for playing the disc has been achieved. Under this condition, the spindle motor 5 is operated to rotate the disc D, while a reading head (not shown) is moved radially, to perform the reproduction.

As was described above, after the disc D inserted into the player is positively clamped with the clamper 7 of the clamper arm 6 and the turntable 4, the disc inserting opening O of the movable cover 12 is closed in synchronization with the operation of releasing the locking pins of the frame 3 supporting the reproducing device. This will positively eliminate the problem of the movable cover 12 being operated with the disc D held in an unstable manner in the player, or the problem of the disc D being inserted into the player and colliding with the movable cover 12 because of the vibration of the traveling vehicle, and thus finally being damaged. Accordingly, the jamming of the disc, which may be caused when the disc is damaged, can be prevented.

Figure 14:
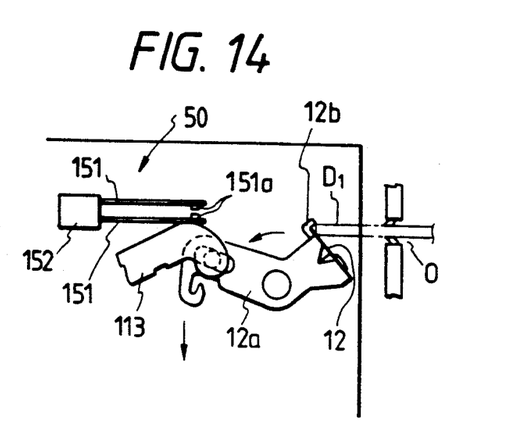
FIG. 14 is a side view showing the alarm mechanism which is in operation.

When the swingable arm 113 operates to turn the movable cover 12 to the closed position, the two contacts 151a of the leaf springs 151 of the alarm mechanism 50 are brought into contact with each other. If, under this condition, another disc $D_1$ is inserted into the disc inserting opening O as shown in FIG. 14, the front edge of the disc $D_1$ is abutted against the locking part 12b of the movable cover 12, so that the opening and closing arm 12a is turned counterclockwise in FIG. 14, and therefore the swingable arm 113 is disengaged from the lower contact piece 151, as a result of which the detecting section 152 operates the alarm device such as a buzzer or lamp.

Felts $f_1$ and $f_2$ are provided on the upper and lower edges, respectively, of the disc inserting opening O to wipe both sides of a disc D being inserted into the player, and to prevent the entrance of dust into the player. Substantially, the same effect can be obtained by providing the felt only on the lower edge of the disc inserting opening O.

After the reproduction, the disc D is unloaded from the player as follows: The loading motor 50 is rotated in the reverse direction to move the planet gear 56 downwardly thereby to swing the loading arm 40, the movable cover 12 and the movable cover operating arm 46 in the opposite direction. That is, the various members are operated in the reverse direction, so that the disc D is released from the clamper arm 6 while the locking mechanisms are operated to lock the supporting frame 3, and the loading rollers 44 and 45 are rotated in the reverse direction, thus unloading the disc D through the disc inserting opening O.

Figure 15:
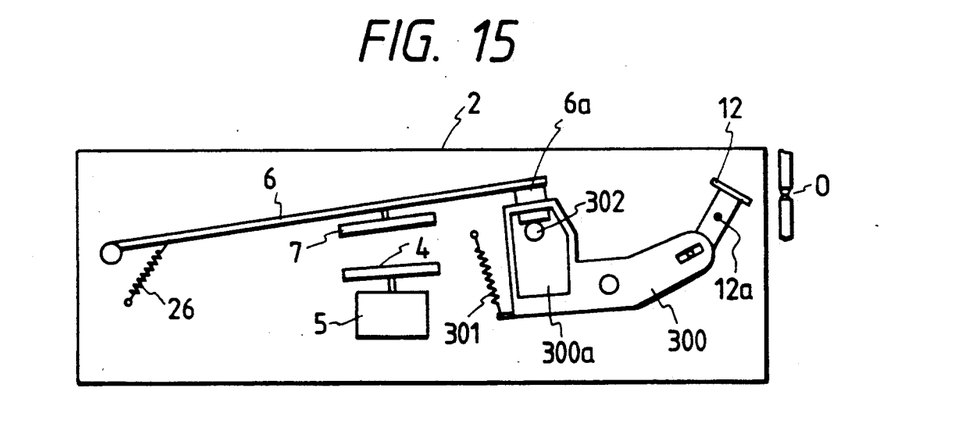
FIG. 15 is an explanatory diagram showing another embodiment of the invention in which the movable cover of a movable cover opening and closing mechanism is opened.
Figure 16:
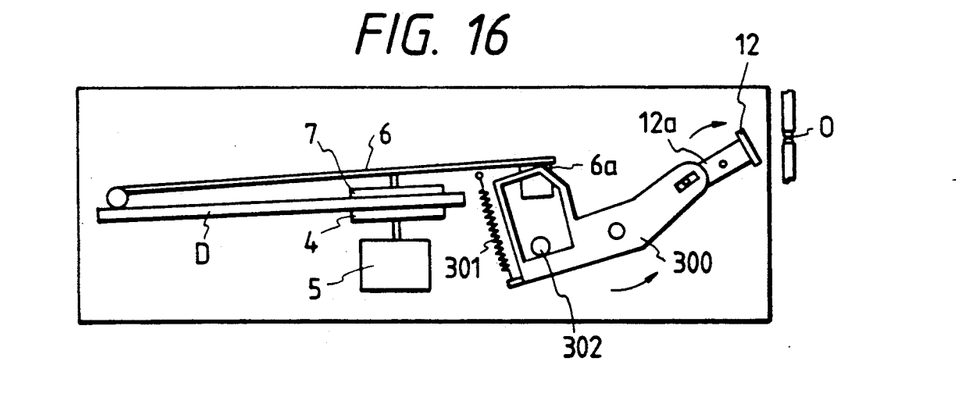
FIG. 16 is an explanatory diagram showing the movable cover of the movable cover opening and closing mechanism shown in FIG. 15 being closed.
Figure 17:
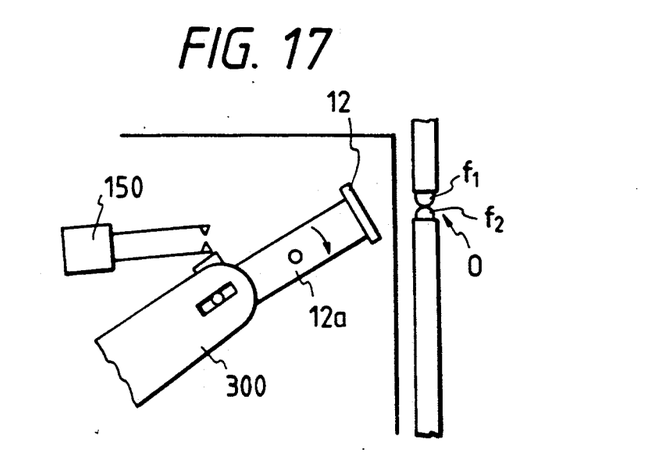
FIG. 17 is an explanatory diagram showing the arrangement of an alarm device which is operated in association with the movable cover opening and closing mechanism shown in FIG. 15.

A second embodiment of the invention will be described with reference to FIGS. 15 through 17, in which those components which have been previously described with reference to the first embodiment are therefore designated by the same reference numerals or characters.

The movable cover is coupled to an opening and closing arm 12a, the lower end of which is pivotally mounted on the front end portion of a swingable arm 300. The swingable arm 300 has an opening 300a in the rear end portion, and is urged clockwise by a coil spring 301. On the other hand, a locking piece 6a is provided at the end of a clamper arm 6 which is pulled downwardly by a tension spring 26, and the locking piece 6a thus provided is abutted against an operating pin 302 which is moved vertically by suitable means. When the operating pin 302 is moved downwardly, as shown in FIG. 16, the clamper arm 6 is also moved downwardly so that the disc D is clamped to the turntable 4 by the clamper 7, and then the operating pin 302 abuts against the lower edge of the opening 300a formed in the swinging arm 300, thus turning the latter 300 counterclockwise in FIG. 16. In the second embodiment also, as shown in FIG. 17, an alarm device 150 similar to that in the first embodiment is provided above the coupling point of the front end of the swinging arm 300 and the lower end of the movable cover opening and closing arm 12a.

As was described above, after the disc has been inserted into the player and is positively clamped in place to the turntable by the clamper of the clamper arm, the movable cover swingably provided adjacent the disc inserting opening of the player is swung to the closed position to close the disc inserting opening, according to the invention. Therefore, even when the traveling vehicle is subjected to a large amount of vibration, the movable cover will not take the closed position before the disc, which has been inserted in the player, is completely clamped by the clamper; i.e., when the disc is held in an unstable manner in the player. Furthermore, the employment of the device of the invention can eliminate the problem of the disc striking against the movable cover and getting caught in the player or any other difficulties attributing the unsatisfactory conveyance of the disc.

We claim:

1. A device for preventing the insertion of a disc in a vehicle CD player while another disc is being played therein, said CD player being of the type including a movable cover swingably mounted adjacent a disc inserting opening such that a disc may be inserted when said movable cover is opened, said CD player further including a clamping arm movable to a clamping position for holding said disc on a turntable, said device comprising interconnecting means for interconnecting said clamping arm and movable cover to prevent said movable cover from opening when said clamping arm is in said clamping position such that after said clamping arm has clamped said disc, said interconnecting means is positioned so that said movable cover is swung to a position closing said disc inserting opening.

2. The device of claim 1, wherein said interconnecting means prevents said movable cover from closing when said clamping arm is not in said clamping position.

3. The device of claim 1, wherein said interconnecting means includes an opening and closing arm swingably mounting said movable cover on a frame and an operating member coupled to said opening and closing arm, said operating member being operated in association with the disc clamping operation of said clamping arm.

4. The device of claim 3, wherein said operating member includes a movable cover operating arm coupled to a loading arm which is lowered after said disc, which is inserted into said player, is moved to a predetermined position in said player: whereby said movable cover operating arm is moved downwardly in synchronization with said loading arm;

said clamping arm is moved downwardly in synchronization with the downward movement of said loading arm; and said movable cover operating arm operates a swinging member coupled to said opening and closing arm after said clamping arm is moved downwardly to a position where said clamping arm clamps said disc.

5. The device of claim 4, wherein said movable cover operating arm is pivotally mounted on one side plate of said frame, while said loading arm is pivotally mounted on the other side plate of said frame;

said movable cover operating arm is coupled to said loading arm through a loading guide plate which extends in the widthwise direction of said frame; and further comprising a locking mechanism for locking a supporting frame supporting a reproducing device, said locking mechanism being operated in response to the operation of said movable cover operating arm.

* * * * *